Feb. 15, 1949.　　　A. K. NELSON　　　2,461,836
FOUL BALL INDICATOR
Filed Oct. 18, 1946
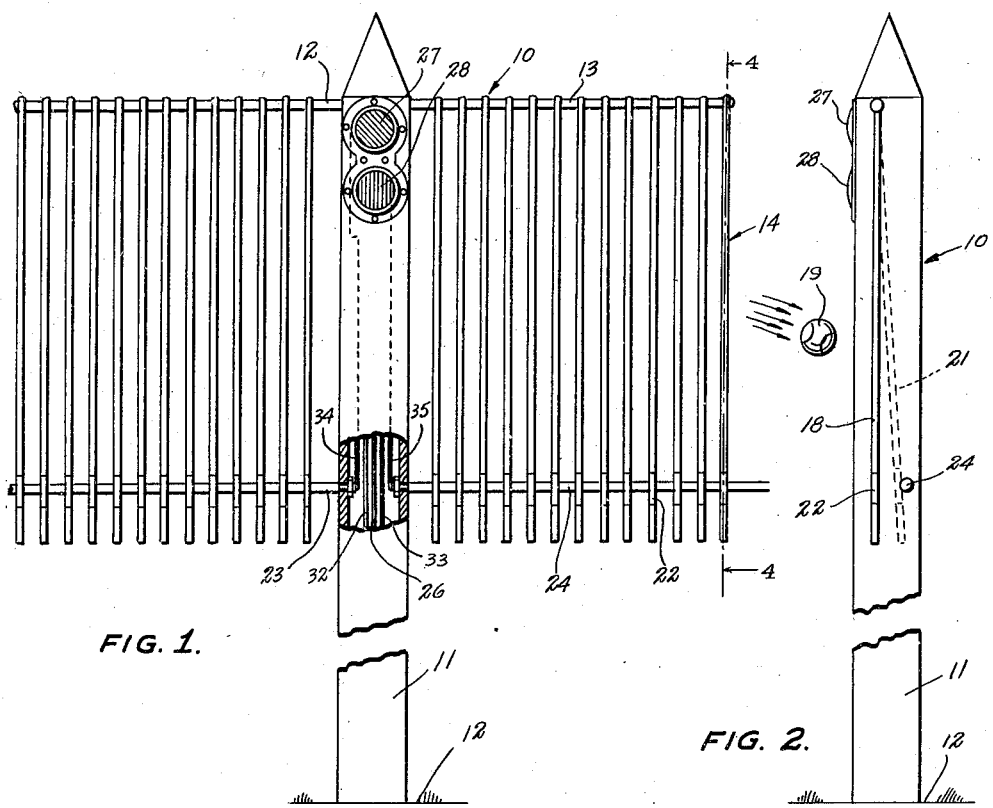
FIG. 1.
FIG. 2.
FIG. 3.
FIG. 4.
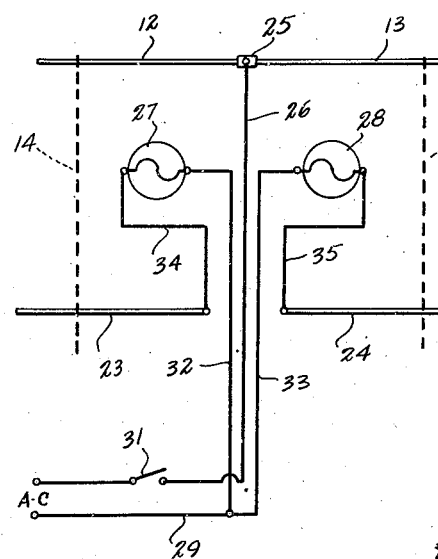
ALLEN K. NELSON,
Inventor Patented Feb. 15, 1949

2,461,836

UNITED STATES PATENT OFFICE 2,461,836

FOUL BALL INDICATOR

Allen K. Nelson, Washington, D. C.

Application October 18, 1946, Serial No. 704,221

2 Claims. (Cl. 177—384)

This invention relates to a foul ball indicator for use upon baseball fields.

In virtually all enclosed baseball parks, extensions of the third and first base lines extend to the outfield barrier and are there extended vertically, usually as either a vertical white line on the barrier or, and more frequently, as a vertically disposed white post, which, in the case of low barriers, extends vertically above the upper terminus of the barrier. Such vertical foul line markers are usually located a substantial distance from the umpire whose duty it is to determine whether a batted ball striking or passing over the barriers in the region of the markers, is fair or foul. Consequently, it is difficult to determine whether or not such a batted ball is fair or foul, particularly where the game is played at night. As such a batted ball invariably results, if declared a fair ball, in an extra base hit, it is vitally important that the umpire render the proper decision in every instance. Obviously, such a decision is difficult only in instances where the batted ball strikes or passes close to such a marker.

It is an object of the present invention to provide a foul ball indicator adapted to be disposed on the base line in the out-field which has portions thereon adapted to be struck by the ball and which will give one indication should the ball be outside of the line and another indication if the ball is inside of the line whereby to indicate whether the ball is foul and outside or whether it is inside and whereby to eliminate the burden upon the umpire of the game of determining whether the ball is foul or not.

It is another object of the invention to provide a foul ball indicator wherein the signals thereof can be visible as well to the patrons within the grandstand as to the umpire, the signal being made by the use of red and green lights.

It is another object of the invention to provide a foul ball indicator which is of simple construction, which can be so disposed on the line as to take up minimum space, and in which the operating parts are so arranged that they cannot easily get out of order.

For other objects and for a better understanding of the invention, reference may be had to the following detailed description taken in connection with the accompanying drawing, in which Figure 1 is a front elevational view of the foul ball indicator bearing the features of the present invention.

Figure 2 is an end elevational view of the foul ball indicator shown in Figure 1.

Figure 3 is a wiring diagram of the lighting circuit.

Figure 4 is a cross sectional view in elevation of one of the swinging rods which extends downwardly from the top of the indicator, and which is made of insulating material and having a charged wire therewithin.

Referring now to the figures, 10 represents the foul ball indicator bearing the features of the present invention and which comprises a post 11 adapted to be disposed located as usual at the end of the extension of the base line which is indicated at 12. This post 11 is hollow and is pointed at its upper end. Extending laterally from opposite sides of the post are two horizontally extending rods 12 and 13. If the post 11 is placed upon the right side of the field the rod 12 will extend inwardly over fair territory of the ball field whereas the rod 13 will extend outwardly over foul territory of the ball field.

Depending from the rods 12 and 13 are a series of arms 14 of conducting material as indicated at 15, Figure 4, surrounded throughout the major portion of its length by insulating material 16. The conducting portion 15 has a ring formation 17 tightly fitting about the rod 12 or 13 to which it is thereby pivotally connected. Normally the rods 14 will be suspended straight downwardly as indicated at 18 in Figure 2 but upon receiving the impact of a ball 19 hit by a batter from the homeplate position, the rod 14 will be moved rearwardly to the dotted line position 21 whereby a conductor portion 22 of the internal portion 15 will engage one of rods 23 or 24 extending outwardly from the sides of the post 11 and respectively rearwardly offset below the laterally extending upper rods 12 and 13.

If the rods 12 and 13 be connected together as indicated at 25 and a terminal wire 26 be connected at 25 and extending from some current source and with the contact portion 22 in engagement with either one of the rods 23 or 24 depending upon which side of the post 11 the ball has struck the rods 14, a circuit will be established from the upper rods 12 and 13, a rod 14, contact portion 22, either rod 23 or 24 and either a lamp 27 or 28. One side of each lamp is connected in common with a second wire leading from an electric current source and as indicated at 29. These lamps 27 and 28 are located at the top of the post 11. The top lamp 27 will project a green ray of light whereby to give indication that the ball has struck the rods at the side which extends over fair territory of the ball field to indicate that it is a fair ball.

If on the other hand the ball has struck the rods extending outside over foul territory of the ball field the lamp 28 will give a red appearance to indicate that there has been a foul ball. At times when the indicator is out of use a switch 31 can be opened to break the circuit connection of the foul indicator with the electric source.

All the wires of the lighting system are contained within the hollow post 11 and adequately protected from the elements. They are also protected from any damage as a result of the ball coming in contact with the indicator. Wires 32 and 33 from the respective lamps 27 and 28 connect the lamps to the common wire 29. A wire 34 connects the lamp 27 with the lower rod 23. A wire 35 connects the lamp 28 with the lower rod 24.

While various changes may be made in the detailed description, it shall be understood that such changes shall be within the spirit and scope of the present invention as defined by the appended claims.

What is claimed as new is:

1. A fair and foul ball indicator for a baseball field, comprising a post adapted to be positioned to extend vertically from the outfield terminus of a foul line, a pair of elongated stationary contacts carried by each post and extending laterally therefrom in opposite directions, a pair of elongated supports carried by each post and extending laterally therefrom in opposite directions, said supports being substantially parallel to said contacts and being vertically spaced and forwardly offset therefrom, one support and contact extending over fair territory and one support and contact extending over foul territory, at least one depending movable contact swingably carried by each support, said movable contacts normally depending vertically in forwardly-spaced relation to their related stationary contacts, said movable contacts being each adapted upon being struck by a batted ball to be moved into contact with its related stationary contact, and separate signal means operatively associated with each pair of movable and stationary contacts, one of said signal means being actuated upon contact of a movable contact with a stationary contact.

2. A fair and foul ball indicator for a baseball field, comprising a post adapted to be positioned to extend vertically from the outfield terminus of a foul line, two pairs of elongated stationary contacts carried by said post in vertically-spaced relation to provide an upper and a lower pair of stationary contacts, one contact of each pair extending laterally of said post over fair territory, the other contact of each pair extending laterally of said post over foul territory, a plurality of laterally-spaced elongated current-conducting arms swingably carried by each upper stationary contact for swinging movement toward and away from the related lower stationary contact, said lower stationary contacts being rearwardly offset relative to said upper stationary contacts whereby said arms normally depend vertically from said upper stationary contact in forwardly-spaced relation to said lower stationary contacts, said arms upon being struck by batted balls being swingable into contact with an appropriate lower stationary contact, separate electric fair and foul ball signal means carried by said post, separate and normally open electric circuits operatively connecting related upper and lower stationary contacts to separate signal means, one of said circuits being closed to actuate said fair ball signalling means when an arm in fair territory is moved by a batted fair ball into engagement with the lower stationary contact located in fair territory, and the other of said circuits being closed to actuate said foul ball signalling means when an arm in foul territory is moved by a batted foul ball into engagement with the lower stationary contact located in foul territory.

ALLEN K. NELSON.

REFERENCES CITED

The following references are of record in the file of this patent:

UNITED STATES PATENTS

| Number | Name | Date |
|---|---|---|
| 1,286,254 | Drews | Dec. 3, 1918 |
| 1,309,105 | Sanford | July 8, 1919 |
| 1,761,317 | Strasser | June 3, 1930 |
| 1,936,328 | Clement | Nov. 28, 1933 |
| 2,061,973 | Loeb | Nov. 24, 1936 |
| 2,168,644 | Browning | Aug. 8, 1939 |
| 2,310,163 | Moxey | Feb. 2, 1943 |